(12) United States Patent
Suissa et al.

(10) Patent No.: US 9,829,304 B2
(45) Date of Patent: Nov. 28, 2017

(54) SENSORLESS POSITION CONTROL OF ACTIVE-MATERIAL ACTUATORS

(71) Applicant: GM GLOBAL TECHNOLOGY OPERATIONS LLC, Detroit, MI (US)

(72) Inventors: Avshalom Suissa, Kiryat Ono (IL); Armin Biess, Ness-Ziona (IL)

(73) Assignee: GM Global Technology Operations LLC, Detroit, MI (US)

( * ) Notice: Subject to any disclaimer, the term of this patent is extended or adjusted under 35 U.S.C. 154(b) by 444 days.

(21) Appl. No.: 13/898,682

(22) Filed: May 21, 2013

(65) Prior Publication Data

US 2014/0346980 A1  Nov. 27, 2014

(51) Int. Cl.
*G01B 7/00* (2006.01)
(52) U.S. Cl.
CPC .................. *G01B 7/003* (2013.01)
(58) Field of Classification Search
CPC ....................................... G01B 7/003
USPC .................... 324/207, 691; 60/207, 527, 528
See application file for complete search history.

(56) References Cited

U.S. PATENT DOCUMENTS

| | | | | |
|---|---|---|---|---|
| 2008/0282696 | A1* | 11/2008 | Wada | G03B 3/10 60/528 |
| 2009/0218859 | A1* | 9/2009 | Lawall | B60N 2/4279 297/216.1 |
| 2010/0295654 | A1* | 11/2010 | Pinto, IV | H01H 37/323 337/298 |
| 2011/0277462 | A1* | 11/2011 | Gregory | F03G 7/065 60/527 |
| 2012/0112922 | A1* | 5/2012 | Hillis | A47C 7/72 340/657 |
| 2012/0223727 | A1* | 9/2012 | Gao | F03G 7/065 324/691 |

\* cited by examiner

*Primary Examiner* — Shawki S Ismail
*Assistant Examiner* — Muhammad S Islam
(74) *Attorney, Agent, or Firm* — Mickki D. Murray; Parks IP Law LLC (57) ABSTRACT

A system for estimating a position associated with a pre-tensioned active material without using a position sensor. The system includes an active material being transformable between a first state and a second state in response to a pre-determined stimulus and pre-tensioned to at least a pre-determined threshold, yielding the pre-tensioned active material. The system also includes a processing unit configured to perform various operations. The operations include obtaining a value for electrical resistance of the pre-tensioned active material. The operations also include estimating, using the electrical resistance determined, the position associated with the pre-tensioned active material.

19 Claims, 4 Drawing Sheets

Fig. 1

Fig_2

Fig_4

_US 9,829,304 B2_

SENSORLESS POSITION CONTROL OF ACTIVE-MATERIAL ACTUATORS

TECHNICAL FIELD

The present disclosure relates generally to controlling position of active-material actuators without using a position sensor and, more particularly, to systems and methods for determining and controlling position of active-material actuators, such as shape-memory-alloy (SMA)-based actuators, without using a position sensor.

BACKGROUND

Active, or smart, materials are being used increasingly in a variety of industries. Active materials can provide benefits in cost savings over optional apparatus for performing like functions, space, or packaging, savings, and savings of resources such as computer-processing or other system-control resources. The materials can also be referred to as transformable materials because they transform, or change state, when exposed to a specific stimulus, as described further below.

In some cases, active materials allow longer system life, faster performance, smoother actuation, increased reliability, and/or more-accurate performance of the sub-system in which the material is used as compared to optional apparatus.

Active materials are being used in industries including transportation, such as in automotive, aerospace, and marine vehicles. Uses are not limited to transport vehicles, though. Active materials can be used in most any system requiring selective actuation of one or more mechanical components.

An active material can be described also as phase-change material because it performs work by changing its phase in response to being exposed to a specific stimulus, such as heat, electric current, lack of heat (e.g., cold), and radiation.

A popular active material is a shape memory alloy, or SMA. Other exemplary active materials include electroactive polymers (EAPs), piezoelectric materials, magnetostrictive materials, and electrorestrictive materials.

Shape-memory alloy is the generic name given to alloys that exhibit the relatively unusual property of having a strain memory, which can be induced by an input, e.g., a mechanical or thermal input. This unusual property is characterized primarily by two thermo-mechanical responses known as the Shape-Memory Effect (SME) and Superelasticity.

Exemplary alloys include copper alloys (CuAlZn), nickel-titanium-based alloys, such as near-equiatomic NiTi, known as Nitinol, and ternary alloys such as NiTiCu and NiTiNb. A particular exemplary allow includes NiTi-based SMAs. NiTi-based SMAs one or the best, if not the best memory properties—i.e., readily returnable to a default shape, of all the known polycrystalline SMAs. The NiTi family of alloys can withstand large stresses and can recover strains near 8% for low cycle use or up to about 2.5% for high cycle use. The strain recovery capability can enable the design of SMA-actuation devices in apparatuses requiring the selective transfer of torque from a torque generating device to each of a plurality of output shafts.

In an Austenite, or parent phase of an SMA, the SMA is stable at temperatures above a characteristic temperature referred to as the Austenite finish ($A_f$) temperature. At temperatures below a Martensite finish ($M_f$) temperature, the SMA exists in a lower-modulus phase known as Martensite. The unusual thermo-mechanical response of SMAs is attributed to reversible, solid-state, thermo-elastic transformations between the Austenite and Martensite phases.

In some uses, whichever active material used, accurate position control is not needed. If the active material only need flip a switch in response to a pre-determined stimulus, then fine control of the material is not needed. Rather, it is only necessary to stimulate the material sufficiently to actuate the switch, and then allow the material to return to its pre-actuated state.

In many uses, though, fine position control of the material is needed. As an example, many modern vehicles allow users to create personal seat-position settings specifying preferred positioning of seat components including lumbar, seat back, seat base, etc. If the user requests the pre-stored personal seat position, the system needs to move the applicable seat components accurately as needed. For systems using a piece of active material to move one or more of the seat components, the material needs to be controlled carefully in order to accurately effect the desired position of the dependent seat component(s).

To date, a primary means of controlling SMA position involves using an SMA-position sensor. An example sensor is a linear variable differential transformer (LVDT), also sometimes referred to as a differential transformer. An LVDT is a type of electrical transformer used for measuring linear displacement, e.g., position of an item, such as a wire.

Using such sensors has drawbacks including an increase in required space, or packaging, an increase in system cost, an increase in required resources such as computer-processing, slower system performance, and a possible decrease in system robustness or reliability. As can be seen, many of these shortcomings counter corresponding benefits, mentioned above, of using active materials in the first place.

There is a need for systems and methods configured to accurately determine and control position of active-material (e.g., SMA) actuators without using position sensors.

SUMMARY

The present disclosure relates in some embodiments to a system for estimating a position associated with a pre-tensioned active material without using a position sensor. The system includes an active material being transformable between a first state and a second state in response to a pre-determined stimulus and pre-tensioned to at least a pre-determined threshold, yielding the pre-tensioned active material. The system also includes a processing unit configured to perform various operations. The operations include obtaining a value for electrical resistance of the pre-tensioned active material. The operations also include estimating, using the electrical resistance determined, the position associated with the pre-tensioned active material.

The operation of estimating the position also includes processing calibration data representing behavior of the pre-tensioned active material.

The calibration data includes data items corresponding to a pre-determined behavioral characteristic of the active material when pre-tensioned.

The two data items include two position-resistance data-point pairs. In one implementation, estimating the position of the pre-tensioned active material is performed according to relationships including:

$$x = (\epsilon_L - \epsilon)L = cR + D;$$

$$c = -aL;$$

$$d = L(\epsilon_L - c);$$

$c = (X_A - X_m)/(R_A - R_M)$; and $d = X_M - (c \cdot R_M)$;

wherein:
R is the value for electrical resistance,
L is a base length of the active material;
$\epsilon_L$ is a base strain of the active material corresponding to the base length L;
a is a pre-set constant; and
$(X_1, R_1)$ and $(X_2, R_2)$ represent said position-resistance data-point pairs.

The system is in some implementations is further for controlling the position associated with the pre-tensioned active material, the operations further comprises obtaining information indicating a desired position for the pre-tensioned active material and initiating, in response to obtaining the information, providing the stimulus to the pre-tensioned active material to cause the material to transform toward the desired position.

In one implementation, the operations further include determining, following the operation of estimating the position of the active material, a difference between the position estimated and the desired position, and generating a control signal, corresponding to the difference determined, for adjusting the active material.

The system can be further for controlling the position associated with the pre-tensioned active material. The operations further comprise obtaining information indicating a desired position change for the pre-tensioned active material, and initiating, in response to obtaining the information, providing the stimulus to the pre-tensioned active material to cause the material to transform toward the desired position.

The operations further can comprise determining, following the operation of estimating the position of the active material, a difference between the change of position estimated and the desired change of position, and generating a control signal, corresponding to the difference determined, for adjusting the active material.

Obtaining the value for electrical resistance can include receiving, from an electric meter, a signal indicating the value. In one embodiment, obtaining the value for electrical resistance includes receiving, from an electric meter, data indicating a voltage and a current and determining the value for resistance therefrom.

In some implementations, the operations further comprise controlling the stimulus provided to the active material so that the material is kept within a pre-determined temperature range. In some implementations, the pre-determined temperature range is below an Austenite-finish-phase temperature associated with the active material and above a Martensite-finish-phase temperature associated with the active material.

In some implementations, the system further comprises an electric meter, in electrical communication with the active material, for use in obtaining the value for electrical resistance, and the processing unit comprises a processor and a computer-readable medium holding computer-executable instructions that, when executed by the processor, cause the processor to perform the operations.

In some aspects, the disclosure relates to method, for estimating a position associated with a pre-tensioned active material without using a position sensor. The method includes receiving a signal from an electrical meter indicating, directly or indirectly, a resistance of an active material connected to the meter, wherein the active material is transformable between a first state and a second state in response to a pre-determined stimulus and pre-tensioned to at least a pre-determined threshold, yielding the pre-tensioned active material. The method also includes estimating, by a tangible processing unit, using the electrical resistance determined, the position associated with the pre-tensioned active material.

In some aspects, the present disclosure relates to a computer-readable storage device comprising computer-executable instructions that, when executed by a processor, cause the processor to perform operations, for estimating a position associated with a pre-tensioned active material without using a position sensor. The operations include receiving a signal from an electrical meter indicating, directly or indirectly, a resistance of an active material connected to the meter, wherein the active material is transformable between a first state and a second state in response to a pre-determined stimulus and pre-tensioned to at least a pre-determined threshold, yielding the pre-tensioned active material. The operations also include estimating, using the electrical resistance determined, the position associated with the pre-tensioned active material.

Other aspects of the present technology will be in part apparent and in part pointed out hereinafter.

BRIEF DESCRIPTION OF THE DRAWINGS

It will be appreciated that for simplicity and clarity of illustration, elements shown in the figures have not necessarily been drawn to scale. Dimensions of some of the elements may, for example, be exaggerated relative to other elements for clarity. Further, where considered appropriate, reference numerals may be repeated among the figures to indicate corresponding or analogous elements.

DETAILED DESCRIPTION

As required, detailed embodiments of the present disclosure are disclosed herein. The disclosed embodiments are merely examples that may be embodied in various and alternative forms, and combinations thereof. As used herein, for example, "exemplary," and similar terms, refer expansively to embodiments that serve as an illustration, specimen, model or pattern.

Descriptions are to be considered broadly, within the spirit of the description. For example, references to connections between any two parts herein are intended to encompass the two parts being connected directly or indirectly to each other. As another example, a single component described herein, such as in connection with one or more functions, is to be interpreted to cover embodiments in which more than one component is used instead to perform the function(s).

And vice versa—i.e., multiple components described herein in connection with one or more functions is to be interpreted to cover embodiments in which a single component performs the function(s).

The figures are not necessarily to scale and some features may be exaggerated or minimized, such as to show details of particular components.

In some instances, well-known components, systems, materials or methods have not been described in detail in order to avoid obscuring the present disclosure. Specific structural and functional details disclosed herein are therefore not to be interpreted as limiting, but merely as a basis for the claims and as a representative basis for teaching one skilled in the art to employ the present disclosure.

I. Overview of the Disclosure

In various embodiments, the present disclosure describes systems and methods for performing continuous position determination and position control of active-material actuators, such as shape-memory-alloy (SMA) actuators, without using a position sensor.

The determinations include determining a strain in the active material based on a measured electrical resistance in the material. Actuator position is then calculated based on the determined strain. Generally, position change is equivalent to the strain measured multiplied by a length of the wire. And so position change determined as the change in strain multiplied by the wire length.

The active material is in some embodiments a wire, or a braided structure. Whatever the active-material form, the system is configured to determine position of the actuator using only measurements of electrical resistance of the material.

It has been determined that under basic conditions, without sufficient pre-tension applied to the active material, though, the relationship between material strain and electrical resistance is unpredictable and so unreliable. More particularly the relationship is undesirably non-linear. Active materials also exhibit hysteresis effects and are stress dependent under these circumstances.

In past experiments, various learning algorithms have been used unsuccessfully to accurately estimate, or model, non-linear strain-resistance relations. Example learning algorithms include neural networks, support vector machines, etc. These approaches have proven unrobust under conditions in which the active material is exposed to a varying stress, and in any event over the life cycle of an actuator due to hysteresis. Moreover, these learning mechanisms require significant calibrating, using large training sets, to identify relevant system characteristics.

The three primary shortcomings mentioned—non-linearity, hysteresis, and stress dependency, are briefly described further here in turn.

In a linear system, only data defining a representative line and a single value are needed in order to determine a corresponding value. Or, with data indicating a slope of a line, and the single value, the representative line or any value on the line can be determined readily. In a non-linear system, though, more information is required in order to determine an unknown data value.

Hysteresis is a dependence of a system, not only on its current environment, or conditions, but also on its past environment or conditions. Thus, even if the significant data describing a non-linear system is available, if system performance varies between iterations, it is even more difficult, if not impossible, to accurately determine unknown values reliably over time.

Finally, performance of stress-dependent systems are, as the phrase provides, is dependent on a level of stress placed on a relevant system component. For the present technology, the relevant system component would be the active-material, e.g., SMA wire.

In stress-dependent active-material actuator systems, then, the material acts differently when the material is stressed at a first level than it does when stressed at a second level. Thus, in implementations in which the stressed placed on the active material can varies between performances, a result of providing a predetermined input to the system—e.g., a resulting position of the actuator cannot be anticipated or determined accurately without knowing the stress level as well as data indicating how performance of the material changes with changes in stress.

For these reasons—non-linearity, hysteresis, and stress dependency, accurate positioning and position control of actuators having insufficiently pre-tensioned active material is not commercially feasible. At least because of the non-linear nature of the resistance-strain relationship, for instance, even only decent material position determination requires substantial pre-calibration.

As mentioned, the calibration under these circumstances would need to model as many different conditions as possible, processing the system through a very large training set, and the resulting non-linear relationships stored. This method is costly, in terms of time, processing resources, and storage resources, for instance, and so also financially more expensive. And even with the heightened investment, sensorless position determination and control would likely still be unreliable.

It has been further determined, however, that the aforesaid challenges to accurately determining actuator position and controlling the position in under-tensioned active materials—non-linearity, hysteresis, and stress dependency, are substantially obviated when the active material is pre-tensioned sufficiently. The level of sufficient stress can be referred to as a tension threshold, pre-tension threshold, threshold tension, threshold pre-tension, similar, or other.

The pre-tension is applied using the structures to which the active material is connected. One of the structures, e.g., a connecting anchor point is adjusted to pull the material tauter, or tighter, until the active material is tensioned to at least the threshold.

The adjustment is in some embodiments, made prior to system operation, such as in a manufacturing or pre-manufacturing phase, such as by a person or machine assembling at least the actuator system of the subject apparatus (e.g., vehicle).

In some embodiments, the adjustment is made by the system, such as online, during system operation. The system can include, e.g., a biasing spring or other device configured and arranged in the system to pull the active material to at least the desired, threshold, tension level prior to system operation.

In one, exemplary, implementation including an SMA wire, the pre-tension threshold is about 100 MPa (megapascals). For this implementation, it has been found that relevant system characteristics, including the strain-electrical resistance relationship, are improved when at least 100 MPa of tension is applied to the wire prior to operation.

Regarding the electrical resistance-strain relationship for the wire, the relationship, when pre-tension above this threshold is pre-applied, is linear, or generally or nearly linear. In any event, the relationship is significantly more linear than it would be if the wire was not pre-tensioned or was pre-tensioned below the threshold.

Regarding the other system characteristics, hysteresis is abated to an acceptably low level, as is stress dependency. In some cases, the level for one or both of these characteristics can be reduced to nil, or nearly zero—e.g., no or almost no stress dependency and/or no or almost no hysteresis.

Moreover, the linear resistance-strain relationship, in systems pre-tensioned to above the threshold, can be modeled with a relatively small amount of reference data as compared to systems not pre-tensioned or pre-tensioned below the threshold. As mentioned, for insufficiently tensioned systems, substantial pre-calibration is required, such as by an arduous process of modeling a plethora conditions through a very large training set. In sufficiently tensioned systems, though, only slight reference data indicating the line of the linear relationship is needed.

As described further below, this reference data can include simply two (2) resistance/strain pairs: $X_1$, $R_1$ and $X_2$, $R_2$, wherein $X_1$ represents a first strain, $R_1$ represents a first resistance corresponding to the first strain, $X_1$ represents a second strain, and $R_2$ represents a corresponding second resistance $X_2$. The two data points, which can be referred to as calibration data, can be determined offline, such as in a manufacturing o pre-manufacturing process, or online, such as during seller (e.g., dealership) or customer operation of the apparatus, such as an automobile, in which the actuator is used.

II. Linear Characteristics and Supporting Conditions—FIG. 1

Figure 1:
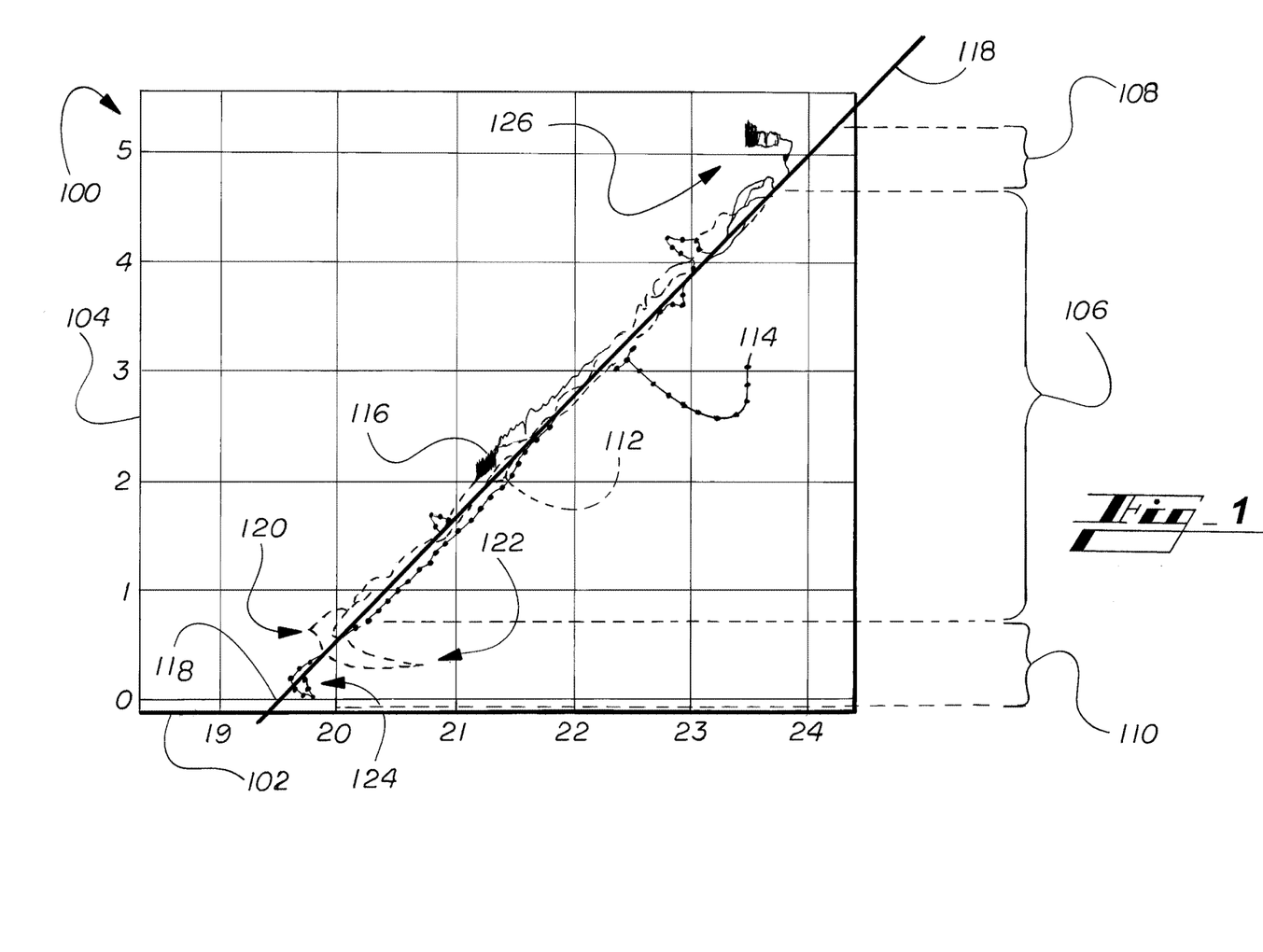
FIG. 1 illustrates a first graph having an x-axis associated with electrical resistance, a y-axis associated with strain, three sets of example data from operation of an actuator according to the present technology, regions of linear and non-linear performance, and a linear representation of the data.

Now turning to the figures, and more particularly to the first figure, FIG. 1 illustrates a graph 100 illustrating strain values against electrical resistance values corresponding to an active material, of an actuator, for which at least a threshold pre-tension is applied. As mentioned above, in one embodiment the threshold is about 100 MPa.

The x-axis 102 represents electrical resistance measured in the active material—e.g., SMA wire. In the illustrated embodiment, the resistance is measured in Ohms. The y-axis 104 represents strain of the active material. In the illustrated embodiment, the strain is represented by percentages. The graph 100 thus shows percentages of strain change from 0% in connection with corresponding electrical resistance of the active material.

As provided, the aforesaid challenges to accurately determining actuator position and controlling the position—non-linearity, hysteresis, and stress dependency, are substantially obviated when the active material is pre-tensioned sufficiently.

With further reference to the graph 100, a region of primary operation for the actuator, and more particularly the active material (e.g., SMA wire), is referenced in FIG. 1 by numeral 106. In the region 106, or zone, area, etc., the active material behaves in the preferred generally linear, non-hysteretic, and stress-independent manner. The region 106 corresponds to a primary range of inputs. For embodiments in which the active material is actuated by heat, the region 106 corresponds to a range of actuating temperatures.

Continuing with the heat-actuated example, the primary operating region 106 corresponds to application of heat between a low-temperature range 108, below a Martensite-finish phase of the active material, and a high-temperature range 110, above an Austenite-finish phase of the active material.

The temperature applied to the active material for the primary region 106, being between low and high temperatures, can be referred to as a working temperature. The region 106 can be referred to as the linear region, the linear regime, the working region, the working temperature region, the working temperature regime, etc.

With continued reference to FIG. 1, data lines 112, 114, 116 of the graph 100 represent strain-resistance results for three tests performed on an SMA-wire active material pre-tensioned to above a threshold of 100 MPa. As shown, the data lines 112, 114, 116 are substantially linear within the working region 106. In the region 106, the SMA wire also exhibits low hysteresis and low stress dependency.

More particularly, the data lines correspond generally to a representative strain-resistance line 118.

As further shown in the graph 100, the strain-resistance relationship of the SMA wire can at times be non-linear outside of the working region 106—i.e., can become non-linear when the actuating temperature is above the Austenite-finish-phase temperature or below the Martensite-finish phase temperature. The non-linearity in at least some embodiments occurs because, outside of the working region 106, strain changes little or none with input-temperature change while electrical resistance changes notably with input-temperature change.

The graph 100 shows, for instance, a first of the data lines 112 departing from the general linear representation 118 of the data in the supra-Austenite-finish region 110 at two locations 120, 122.

As another example of the strain-resistance relationship of the SMA wire being non-linear at times outside of the working region 106, the graph 100 shows a second of the data lines 114 departing from the general linear representation 118 of the data in the sub-Martensite-finish region 108 in a location 124.

As still another example of the strain-resistance relationship of the SMA wire being non-linear at times outside of the working region 106, the graph 100 shows a third of the data lines 116 departing from the general linear representation 118 of the data in the sub-Martensite-finish region 108 in a location 126.

With further reference to representative strain-resistance lines for a actuator system according to the present technology (e.g., line 118), in some implementations, with the input (e.g., temperature) corresponding to the working region 106, and with the SMA wire pre-tensioned to at least the applicable threshold (e.g., 100 MPa), a deviation of less than about 0.1% was been found between wire strain values predicted, based on measured wire resistance, and actual (e.g., measured) strain values for the wire.

Outside of the working region 106 (i.e., in the supra-Austenite-finish region 110 or in the sub-Martensite-finish region 108), the deviation, between wire strain values predicted, based on measured wire resistance, and actual (e.g., measured) strain values for the wire, was still not significant, but generally undesirably higher, usually being below about 1%.

The relationship between strain and electrical resistance can be represented by the following equation:

$$\epsilon = aR + b \quad \text{(Equation 1)};$$

wherein:
  $\epsilon$ represents wire strain;
  R represents a resistance of the active material (e.g., SMA wire);
  and
  a and b are constants.

As mentioned above, the resulting strains, which can be measured in percentage, such as shown in FIG. 1, or a decimal analog, correspond to an amount that the wire has been elongated or shortened, and so a position of the component being actuated by the active material (e.g., automotive power seat component).

More particularly, the data lines correspond generally to a representative strain-resistance line 118, which is also shown in the figure. In some implementations, with the input (e.g., temperature) corresponding the working region 106, and with the SMA wire pre-tensioned to at least the applicable threshold (e.g., 100 MPa), a deviation of less than about 0.1% was been found between wire strain values predicted, based on measured wire resistance, and actual (e.g., measured) strain values for the wire.

Outside of the working region 106 (i.e., in the supra-Austenite-finish region 110 or in the sub-Martensite-finish region 108), the deviation, between wire strain values predicted, based on measured wire resistance, and actual (e.g., measured) strain values for the wire, was still not significant, but generally undesirably higher, usually being below about 1%.

III. Processing Structure—FIG. 2

Apparatus according to the technology includes at least one processing unit configured to perform functions described herein, such as calculating a position associated with the active material (e.g., SMA wire) based on the electrical resistance of the material.

In some embodiments, the processing unit includes one or more relatively-simple devices. In a contemplated embodiment, the unit includes a programmable controller. In some embodiments the unit includes a computer system.

Figure 2:
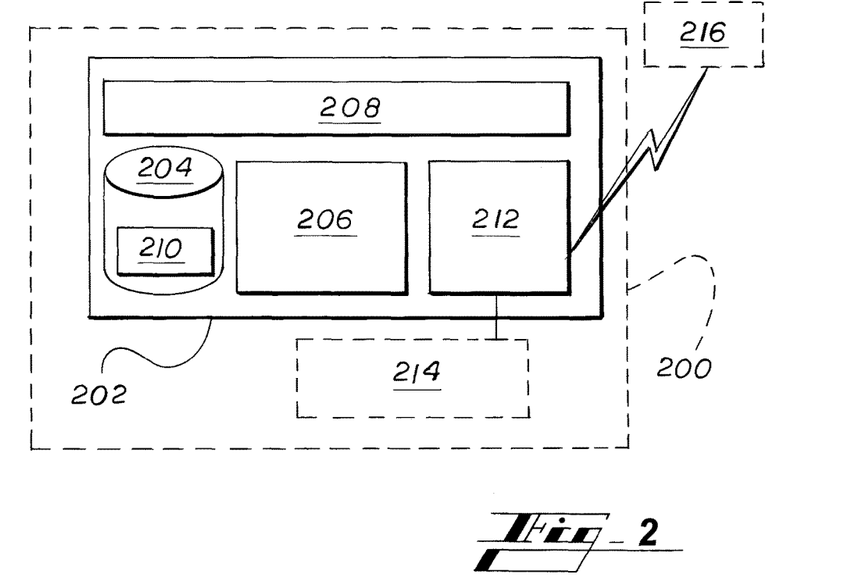
FIG. 2 illustrates an exemplary computing system for use in performing some or all of the processing-related functions described herein.

FIG. 2 illustrates an example computer system 202 for use in performing the operations of the present technology. The system 202 includes a memory, or computer-readable medium 204, such as volatile medium, non-volatile medium, removable medium, and non-removable medium.

The term computer-readable media and variants thereof, as used in the specification and claims, refer to tangible storage media. The media can be a device, and can be non-transitory.

In some embodiments, the storage media includes volatile and/or non-volatile, removable, and/or non-removable media, such as, for example, random access memory (RAM), read-only memory (ROM), electrically erasable programmable read-only memory (EEPROM), solid state memory or other memory technology, CD ROM, DVD, BLU-RAY, or other optical disk storage, magnetic tape, magnetic disk storage or other magnetic storage devices.

The computing system 202 also includes a computer processor 206 connected or connectable to the computer-readable medium 204 by way of a communication link 208, such as a computer bus.

The computer-readable medium 204 includes computer-executable instructions 210. The computer-executable instructions 210 are executable by the computer processor 206 to cause the processor, and thus the computing system 202, to perform all or any combination of the functions described in the present disclosure.

The computer-executable instructions 210 can be arranged in one or more software modules, or engines, or the like. The modules can be referred to by the operations or operations that they cause the computer processor 206 to perform. For instance, a module including instructions that, when executed by the processor 206, cause the processor to perform an operation of measuring an electrical resistance can be referred to as resistance-measuring module, an electrical-resistance-measurement engine, or the like.

Similarly, a module causing the computer processor to perform an operation of determining a position of a component actuated by the active material (e.g., SMA wire) can be referred to as a position-determining module, a position-determining engine, or the like.

The term software module, or variants thereof, is used expansively herein to include routines, program modules, programs, components, data structures, algorithms, and the like. Software modules can be implemented on various system configurations, including servers, network systems, single-processor or multiprocessor systems, minicomputers, mainframe computers, personal computers, hand-held computing devices, mobile devices, microprocessor-based, programmable consumer electronics, combinations thereof, and the like.

The computer processor 206 is also connected or connectable to at least one interface 212 for facilitating communications, between the computing system 202 and local components 214, and between the computing system 202 and remote components 216.

For communicating with the local components 214, the interface 212 can include one or both of wired connections and wireless components—e.g., transceiver, transmitter, and/or receiver.

Example local components include an instrument measuring electrical resistance of the active material (e.g., SMA wire), such as an ohmmeter or a multimeter, and local instrumentation that may be connected at least intermittently at times to the vehicle, e.g., into the interface 812 directly. Multimeters measure multiple electrical properties, typically including electrical resistance and voltage. Some such meters, measuring at least electrical resistance (R) and voltage (V) are referred to as volt-ohm meters, or VOMs, and many of these can also measure current (I). In some cases, the device measures two of these three characteristics and determines the third of these using Ohm's law: $V = I \cdot R$, or provides the two measurements to a processor, such as the processor 206 of FIG. 2, which in turns calculates the third value. In one embodiment, for instance, current (I) and voltage (V) passing through the active material (e.g., SMA wire) are measured, and the corresponding resistance (R) calculated therefrom.

For communicating with the remote components 216, the interface 212 includes one or both of a short-range transceiver (or transmitter and/or receiver) and a long-range transceiver (or transmitter and/or receiver).

The remote components 216 can include databases, servers, other processors, other storage mediums, and/or other computing devices. Software updates for the computer-executable code 210 can be received, for instance, from a customer-service system such as the OnStar® system.

Although shown as being a part of the computer system 202, completely, the interface 212, or any aspect(s) thereof, can be partially or completely a part of the system 202. The interface 212, or any aspect(s) thereof, can be partially or completely external to and connected or connectable to the computing system 202.

IV. Reference Data Representing Strain-Resistance Line—FIG. 3

Figure 3:
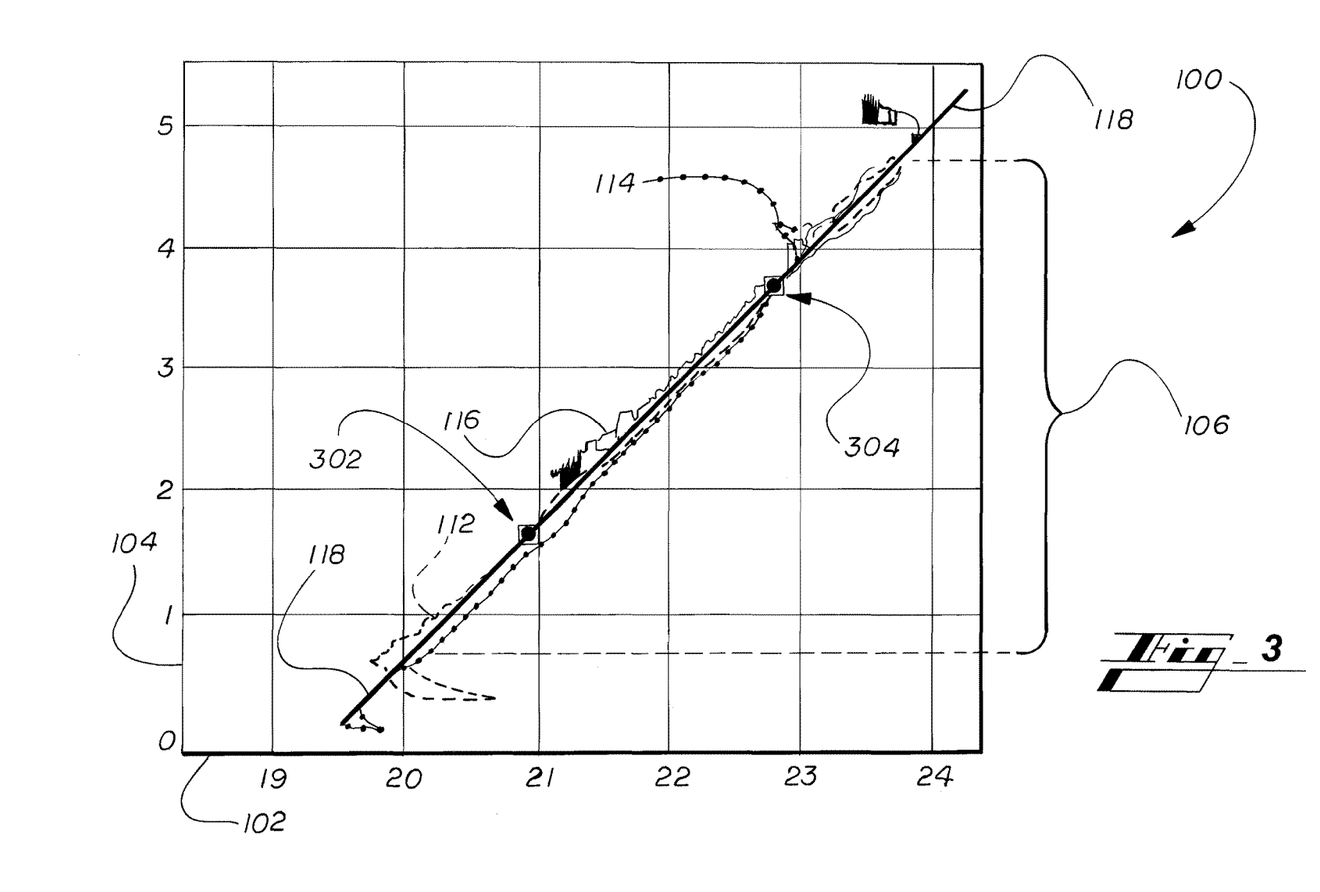
FIG. 3 illustrates the first graph of FIG. 1 calling out two points used to define the representative line formed by the data.

FIG. 3 shows the graph 100 of FIG. 1 with additional notations. The graph 100 again includes the x-axis 102, representing active-material electrical resistance, and the y-axis 104, representing active-material strain corresponding to the various resistance levels sensed. The graph again shows the same data lines 112, 114, 116, showing generally preferred properties, including strain-resistance linearity, within the working region 106.

As mentioned, determining actuator position, and so a position of a component (e.g., automotive seat part) being actuated can be determined based on actuator active material strain, which can be calculated based on measured electrical resistance levels in the material. Position control can then be executed using the determined positioned to obtain a desired position for the material, and so for the actuated component.

Further in this process, in one embodiment of the present technology, predicting strain for position control a position (x) of the active material is used. The position (x) relates in turn to a base or initial wire length (L) and corresponding base or initial strain ($\epsilon_L$)—e.g., a length and strain of the wire when pre-tensioned to or above the threshold but not exposed to stimulus, e.g., electric current or heat). The relationships can be represented as follows:

$$x=(\epsilon_L-\epsilon)L=cR+D \quad \text{(Equation 2)}$$

wherein:

$$c=-aL \quad \text{(Equation 3); and}$$

$$d=L(\epsilon_L-c) \quad \text{(Equation 4)}.$$

The values for c and d can be determined using two data reference points representing respectively two resistance-wire position pairs. FIG. 3 shows two example reference points 302, 304, which can be represented also as ($R_A$, $X_A$) and ($R_M$, $X_M$), respectively.

The indicator, A, in the coordinate representation of the first reference point 302, ($R_A$, $X_A$), represents Austenite, because the point 302 is closer to the conditions of Austenite phase for the active material (reference supra-Austenite-phase region 110 in FIG. 1). The M in the coordinate representation of the first reference point 302, ($R_M$, $X_M$), represents Martensite, because the point 302 is closer to the conditions of Martensite phase for the active material (reference sub-Martensite-phase region 108 in FIG. 1).

While resistance and position values are used, and represented here by the convention, ($R_A$, $X_A$) and ($R_M$, $X_M$), other values and conventions may be used. For instance, the data can be represented as ($R_1$, $X_1$) and ($R_2$, $X_2$), or, in a contemplated embodiment, strain measurements can be considered instead with corresponding resistance values at this stage, e.g., ($R_A$, $\epsilon_A$) and ($R_M$, $\epsilon_M$).

Using the exemplary convention, ($R_A$, $X_A$) and ($R_M$, $X_M$), the values for c and d can be determined as follows:

$$c=(X_A-X_M)/(R_A-R_M) \quad \text{(Equation 5); and}$$

$$d=X_M-(c \cdot R_M) \quad \text{(Equation 6)}.$$

In some implementations, the resulting position value, x, is a final result of the process. In others, the resulting position value x is used in further calculations or other processing. An example processing involves using the determined position value x in controlling the actuation system position. This processing is described further below in connection with FIG. 4.

V. Position Determination and Control Algorithm—FIG. 4

Figure 4:
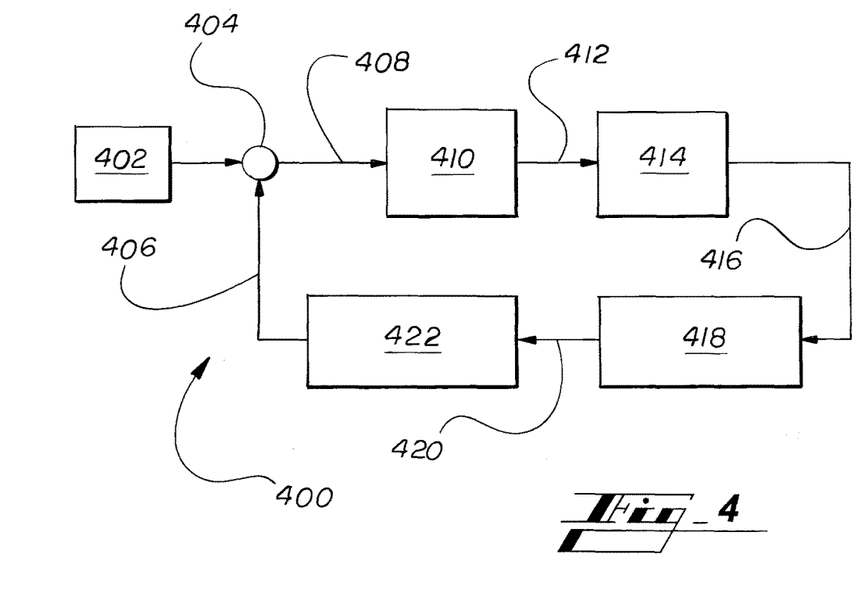
FIG. 4 illustrates an exemplary method for using the present technology.

FIG. 4 shows an exemplary process 400, or algorithm-defined method, for controlling actuator position using position values arrived at based on resistance measurements, according to the present technology. The process 400 can be performed at least in part by a processor, such as the processor 206 described above in connection with FIG. 2, executing computer-executable instructions, such as the instructions 210 described. Likewise, any or all of the process functions described can be fully or partially represented by an algorithm embodied in the code 210.

The process 400 includes an input 402 provided to, or generated by, the system, including a desired actuator position or change in actuator position. The input can be referred to, e.g., by $x_{command}$, $x_{com}$, $x_{desired}$, $x_{des}$, $\Delta x_{desired}$, $\Delta x_{command}$, $\Delta x_{com}$, the like, or other nomenclature. If an automotive seat back were positioned at a position represented by 5 units, and a user selects a pre-stored seat position for which the seat back has a position of 8 units, then the desired change in actuator position would be 3 units. With units of centimeters, for instance, the relationship can be referred to as $\Delta x_{command}$=5 cm.

The process input 402 is provided to a processing junction 404, such as an engine or module of the present system. The junction 404 can be referred to by other functional names, such as a position-difference determining node, $x_{diff}$ module, position$_{diff}$ engine, a position-difference-determining junction or engine, other, other, or the like.

The processing junction 404 subtracts from the input 402 ($\Delta x_{command}$), any position estimation ($x_{estimated}$) resulting from an earlier, position-determination, step or recent iteration of the process 400.

For embodiments in which there is no earlier determination, e.g., no recent iteration of the process 400, there is no existing estimated position ($x_{estimated}$), or the estimated position can be considered nil in the present iteration (e.g., $x_{estimated}$=0). The previous position estimate ($x_{estimated}$), is described further below, in connection with embodiments having a prior iteration of determining a position (e.g., operation 422).

Output, or the resulting difference, from the combining, or processing, junction 404 is represented in FIG. 4 by path 408 as input to control junction 410. The control junction 410 can also be referred to as a control module, control engine, etc.

The difference 404 can be represented by the symbol, e, and thus more particularly by the following relationship:

$$e=(\Delta x_{command})-(x_{estimated}) \quad \text{(Equation 7)}.$$

With continued reference to the flow 400 of FIG. 4, the control module 410 provides the needed position difference, e, by signal or data path 412, to the active material (e.g., SMA wire), represented schematically by numeral 414. The position difference can be referenced by other names, e.g., $x_{diff}$.

Electrical flow, or output, passing through the active material 414 is represented schematically by numeral 416. The electrical flow 416 includes a current (I) having a voltage (V).

A resistance (R) of the active material 414 is then determined at processing module 418, which can also be referred to by resistance-determination engine, etc. As mentioned, electrical resistance (R) can be determined in a variety of ways, including by calculating the resistance based on a current (I) and a voltage (V) measured by an electrical meter such as a multimeter. Or the resistance (R) can be received from a meter that outputs a value for resistance (R).

The resulting, present, resistance ($R_{measurement}$, or $R_{meas}$, or just R) value 420 is provided to a position-determination module 422. The module 422 determines a new position (x) of the actuator, corresponding to the present resistance (R). In one embodiment, the module 422 determines the new position (x) of the actuator according to the second equation (Equation 2), above [x=c·$R_{meas}$+d].

The resulting new position determination (x) is considered a most-recent best estimate, or new $x_{estimated}$, or $x_{est}$. And, further according to the process 400, the new estimated position estimate $x_{est}$ is, as referenced above, provided Further according to the process 400, the resulting new position (x) determined is, as referenced above, provided to the position-difference determining module 404.

The difference-determining module 404 then uses the new position ($x_{est}$) to determine of a new position difference e (or $x_{diff}$), if any, between a most-recent desired position change (e.g., $\Delta x_{command}$, or $x_{desired}$) and the new position ($x_{est}$). E.g., the new position difference is determined using the newest data and the seventh equation (Equation 7), above—e= ($\Delta x_{command}$)−($x_{est}$), or e=($x_{command}$)−($x_{est}$).

The flow 400 can be used to, in one or more iterations of the loop shown and described, approach and reach a desired actuator position in any of a variety of ways. These ways can depend, in some cases on the type of input 402 received. Some examples are as follows.

For embodiments in which the input 402 is a position of the actuator, it will be appreciated that the loop of the process 400 functions to move the actuator toward (e.g., closer and closer in one or more iterations) a desired or command position, which may change between iterations. When the difference (difference e, or $x_{diff}$) between the desired position e=($x_{command}$) and the estimated position ($x_{est}$) is zero, the most recent position request has been reached, and the process can end, at least temporarily. The process can be restarted upon receipt of a new input 402—i.e., new position command (or $x_{command}$).

For one contemplated embodiment in which the input 402 is a requested change in position of the actuator, the process 400 includes an operation, following the position determination 422, in which a change of position since a last-determined position of the actuator is determined. For instance, if the actuator is located at a position of 3 units, the input 402 requests a change of positive 4 units (which would correlate to a target actuator position of 7 units), an iteration of the method 400 resulted at operation 422 with a position of 6 units, then the contemplated operation (not illustrated in detail) would include determining that change of positive 3 units has been effected. At the subsequent performance of the combining operation 404, it would be determined, assuming that a different input 402 was received in the interim, that another positive (+1) unit of actuation is needed.

For another contemplated embodiment in which the input 402 is a requested change in position of the actuator, the process 400 includes an operation, in or prior to the difference determination 404, in which a desired position is determined. If for instance, the actuator is at a position of 5 units and the input includes a desired change of position ($\Delta x_{command}$) of 4 units, then the contemplated operation in this case would determine that the desired position is 9 units. The flow 400 of this embodiment would then proceed with the loop as described above in connection with the above-described embodiments in which a desired position $x_{command}$ is input at block 402.

In one contemplated embodiment in which the input 402 includes position (e.g., $x_{command}$), the process 400 includes an operation, in, prior to, or following the difference-determination 404, of determining a needed change of position (or $\Delta x_{command}$). The loop then proceeds generally as described above in connection with the embodiments in which a desired change of position $\Delta x_{command}$ is input 402 in the first place.

It should be understood that the steps of the method are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. It should also be understood that the illustrated method can be ended at any time.

In certain embodiments, some or all steps of this process, and/or substantially equivalent steps are performed by a processor, e.g., computer processor, executing computer-executable instructions stored or included on a computer-readable medium, such as the memory of the computing system described above.

VI. Example Results of Implementation—FIG. 5

Figure 5:
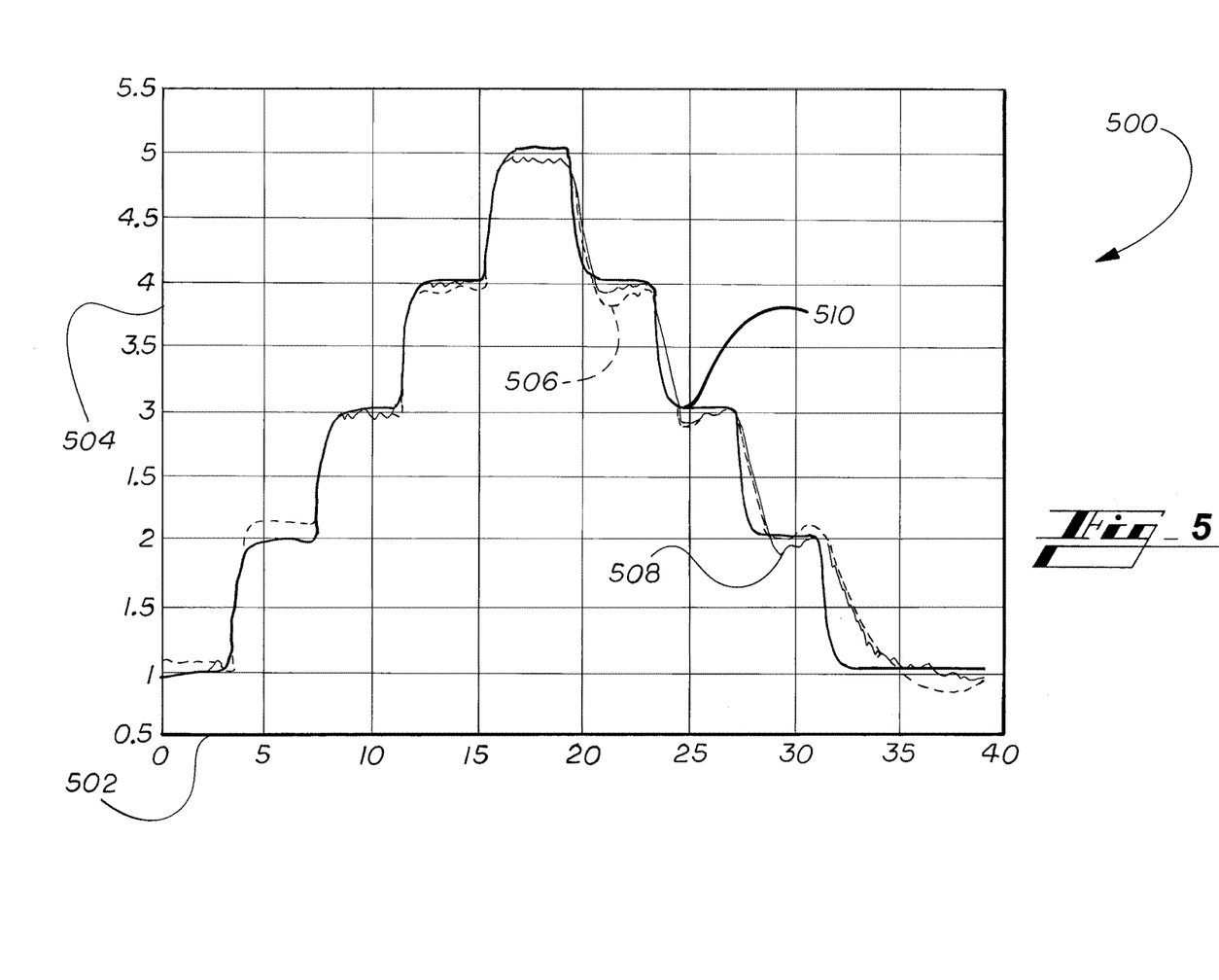
FIG. 5 illustrates a second graph showing experimental results from a closed-loop position-control scheme of the present technology.

FIG. 5 shows a graph 500 showing experimental results for a closed-loop position-control scheme, according to the present technology.

The x-axis 502 of the graph 500 represents time, e.g., in seconds. The y-axis 504 represents position of the actuator, or active material, or a position of a component controlled by the active material. The y-axis units may be, e.g., millimeters.

For this particular example, the active material was an SMA wire pre-tensioned to 200 MPa.

A first instance of graph data 506 represents an actual position of an actuator as measured by an LVDT sensor, which can be referred to as $x_{measured}$ or $x_{meas}$, for instance. A second instance of graph data 508 represents an actuator position ($x_{est}$) as estimated according to a performance of the present technology (e.g., one or more iterations of the loop of FIG. 4). The third data 510 represents an input position command—e.g., $x_{command}$.

As can be seen from the graph 500, the desired position, or position command) $x_{command}$ changes with time. More particularly, it is changed every few seconds.

As can also be seen in the graph 500, the estimated position ($x_{est}$) position, based on resistance (R), generally matches the desired position ($x_{command}$), as well as the measured position ($x_{meas}$). Moreover, the desired mimicking relationship occurs smoothly, without undesirable lag.

VII. Benefits

Benefits of the present technology include allowing continuous and smooth position control of an active-material (e.g., SMA-wire) actuator without using an actuator-position sensor (e.g., LVDT).

Another potential benefit is financial cost saving, such as those that would be otherwise associated with the costs of such a position sensor.

Another potential benefit is savings of system weight and size (or packaging), such as that otherwise associated with systems requiring such a position sensor.

In some cases, the present technology may be more reliable than comparable systems, such as due to lacking the mentioned position sensor, and so being free of potential position sensor fault or failure.

Systems according to the present technology also have relatively-low computational burden, which can also be less than that of actual or hypothetical comparable systems, such as those requiring such position sensor.

Systems according to the present technology also require relatively-little calibration, or representative data, for use in system calibration as compared to hypothetical or actual comparable systems, such as a hypothetical system including an actuator in which an SMA wire is not pre-tensioned, or at least not pre-tensioned above an appropriate threshold tension level, as described further herein above.

VIII. Conclusion

Various embodiments of the present disclosure are disclosed herein. The disclosed embodiments are merely examples that may be embodied in various and alternative forms, and combinations thereof.

The law does not require and it is economically prohibitive to illustrate and teach every possible embodiment of the present technology. Hence, the above-described embodiments are merely exemplary illustrations of implementations set forth for a clear understanding of the principles of the disclosure.

Variations, modifications, and combinations may be made to the above-described embodiments without departing from the scope of the claims. All such variations, modifications, and combinations are included herein by the scope of this disclosure and the following claims.

What is claimed is:

1. A system, for calculating an initial position value ($X_{estimated}$) of a pre-tensioned active material, without using a position sensor, for use as a starting position in controlling position of the active material toward a desired resulting position ($X_{desired}$), comprising:
an active material being:
transformable between a first state and a second state in response to a pre-determined stimulus; and
pre-tensioned to at least a pre-determined threshold, yielding the pre-tensioned active material; and
a processing unit comprising a hardware-based processing device and a non-transitory computer-readable storage device comprising computer-executable code that, when executed by the hardware-based processing device, performs operations comprising:
obtaining data indicating a value for electrical resistance of the pre-tensioned active material;
obtaining data indicating a base length (L) of the pre-tensioned active material;
obtaining data indicating a base strain ($\epsilon_L$) corresponding to the base length (L) of the pre-tensioned active material;
obtaining position-change information regarding the pre-tensioned active material
calculating the initial position value ($X_{estimated}$) of the pre-tensioned active material using (i) the data indicating the electrical resistance obtained for the pre-tensioned active material, (ii) the data indicating a base length (L) of the pre-tensioned active material, and (iii) the data indicating a base strain ($\epsilon_L$) corresponding to the base length (L) of the pre-tensioned active material; and
generating, based on the position-change information and the initial position value ($X_{estimated}$) calculated, a control signal for providing the pre-determined stimulus to adjust the active material from the initial position value ($X_{estimated}$) to the desired resulting position)($X_{desired}$).

2. The system of claim 1, wherein the pre-determined threshold is about 100 megapascals, and the active material is pre-tensioned to the pre-determined threshold thereby avoiding non-linearity in resistance-strain relationship of the active material, hysteresis effects and stress dependency in using the active materials.

3. The system of claim 1, wherein:
the operation of calculating the initial position value ($X_{estimated}$) includes processing calibration data representing behavior of the pre-tensioned active material; and
the calibration data includes data items corresponding to a pre-determined behavioral characteristic of the active material when pre-tensioned.

4. The system of claim 1, wherein:
calculating the initial position value ($X_{estimated}$) of the pre-tensioned active material is performed according to relationships including:

$$x = (\epsilon_L - \epsilon)L = cR + d;$$

$$c = -aL;$$

$$d = L(\epsilon_L - c);$$

$$c = (X_A - X_M)/(R_A - R_M); \text{ and}$$

$$d = X_M - (c \cdot R_M);$$

R is the value for electrical resistance;
L is the base length of the active material;
$\epsilon_L$ is the base strain of the active material corresponding to the base length L;
a is a pre-set constant; and ($X_A$, $R_A$) and ($X_M$, $R_M$) represent two position-resistance data-point pairs.

5. The system of claim 1, wherein:
the position-change data indicates the desired resulting position ($X_{desired}$) for the pre-tensioned active material; and
the operations further comprise initiating, by way of the control signal, providing the pre-determined stimulus to the pre-tensioned active material to cause the material to transform from the calculated initial position value ($X_{estimated}$), as the starting position, toward the desired resulting position value ($X_{desired}$).

6. The system of claim 1, wherein:
the position-change data comprises a desired position change ($\Delta X_{command}$) for the pre-tensioned active material;
the desired position change ($\Delta X_{command}$) is a difference between the desired resulting position ($X_{desired}$) and the initial position value ($X_{estimated}$) calculated; and
the operations further comprise initiating providing the stimulus to the pre-tensioned active material to cause the material to transform from the initial position value ($X_{estimated}$) calculated toward a resulting position to the desired resulting position value ($X_{desired}$) to achieve the desired position change ($\Delta X_{command}$).

7. The system of claim 1, wherein the operations further comprise controlling the stimulus provided to the active material so that the material is kept within a pre-determined working temperature range to ensure the material exhibits a generally linear strain-resistance relationship, low hysteresis, and low stress dependency, as compared to a less linear strain-resistance relationship, higher hysteresis, and higher stress dependency that the active material would exhibit if operated outside of the pre-determined working temperature range.

8. The system of claim 1, further comprising an actuator, wherein the active material is a part of the actuator.

9. The system of claim 1, wherein system components including the active material and the processing unit are configured for implementation with an automotive seat to control positioning of the seat.

10. The system of claim 5, wherein:
the operations further comprise determining, following the operation of calculating the initial position value ($X_{estimated}$), a position-value difference ($X_{diff}$) between the initial position value ($X_{estimated}$) calculated and the desired resulting position value ($X_{desired}$), representing a required distance needed to move the active material to the resulting position value ($X_{desired}$) from the initial position value ($X_{estimated}$); and generating the control signal is performed using the position-value difference ($X_{diff}$) determined.

11. The system of claim 6, wherein the operations further comprise:
   generating the control signal, based on the desired change of position ($\Delta X_{command}$), for adjusting the active material.

12. The system of claim 7, wherein the pre-determined temperature range is below an Austenite-finish-phase temperature of the active material and above a Martensite-finish-phase temperature of the active material.

13. A system, for controlling a pre-determined stimulus provided to an active material and calculating an initial position value ($X_{estimated}$) of the active material, without using a position sensor, for use as a starting position in controlling position of the active material toward a desired position ($X_{desired}$), comprising:
   an active material being:
      transformable between a first state and a second state in response to the pre-determined stimulus; and
      pre-tensioned to at least a pre-determined threshold, yielding a pre-tensioned active material; and
   a processing unit comprising a hardware-based processing device and a non-transitory computer-readable storage device comprising computer-executable code that, when executed by the hardware-based processing device, performs operations comprising:
      obtaining a value for electrical resistance of the pre-tensioned active material;
      calculating, using the electrical resistance obtained, the initial position value ($X_{estimated}$) of the pre-tensioned active material; and
      controlling the pre-determined stimulus provided to the active material, using the initial position value ($X_{estimated}$) calculated and so that the material is kept within a pre-determined working temperature range to ensure the material exhibits a generally linear strain-resistance relationship, low hysteresis, and low stress dependency, as compared to a less linear strain-resistance relationship, higher hysteresis, and higher stress dependency that the active material would exhibit if operated outside of the pre-determined working temperature range.

14. The system of claim 13, wherein:
   the operations further comprise obtaining either (A) position information indicating the desired resulting position ($X_{desired}$), or (B) position information indicating the desired position change ($\Delta X_{command}$), for the pre-tensioned active material; and
   initiating, in response to obtaining the position information, providing the stimulus to the pre-tensioned active material to cause the material to transform from the calculated initial position value ($X_{estimated}$) toward a resulting position to achieve the desired position change ($\Delta X_{command}$) or desired resulting position ($X_{desired}$).

15. A system, for calculating an initial position value ($X_{estimated}$) of a pre-tensioned active material, without using a position sensor, for use as a starting position in controlling position of the active material toward a desired resulting position ($X_{desired}$), comprising a processing unit comprising a hardware-based processing device and a non-transitory computer-readable storage device comprising computer-executable code that, when executed by the hardware-based processing device, performs operations comprising:
   obtaining data indicating a value for electrical resistance of the pre-tensioned active material, the material being transformable between a first state and a second state in response to a pre-determined stimulus, and pre-tensioned to at least a pre-determined threshold;
   obtaining data indicating a base length (L) of the pre-tensioned active material;
   obtaining data indicating a base strain ($\epsilon_L$) corresponding to the base length (L) of the pre-tensioned active material;
   obtaining position-change information regarding the pre-tensioned active material;
   calculating the initial position value ($X_{estimated}$) of the pre-tensioned active material using (i) the data indicating the electrical resistance obtained for the pre-tensioned active material, (ii) the data indicating a base length (L) of the pre-tensioned active material, and (iii) the data indicating a base strain ($\epsilon_L$) corresponding to the base length (L) of the pre-tensioned active material; and
   generating, based on the initial position value ($X_{estimated}$) calculated and the position-change information, a control signal for providing the pre-determined stimulus to adjust the active material from the initial position value ($X_{estimated}$) to the desired resulting position ($X_{desired}$).

16. The system of claim 15, wherein the operations further comprise initiating, by way of the control signal, providing the pre-determined stimulus to the pre-tensioned active material to cause the material to transform from the calculated initial position value ($X_{estimated}$), as the starting position, toward the desired resulting position value ($X_{desired}$).

17. The system of claim 15, wherein:
   the position-change information comprises the desired resulting position value ($X_{desired}$); and
   the operations further comprise:
      determining a position-value difference ($X_{diff}$) between the initial position value ($X_{estimated}$) calculated and the desired resulting position value ($X_{desired}$), representing a required distance needed to move the active material to the resulting position value ($X_{desired}$) from the initial position value ($X_{estimated}$), and
      generating the control signal is performed using the position-value difference ($X_{diff}$) determined.

18. The system of claim 15, wherein:
   the position-change information comprises the desired resulting position value ($X_{desired}$); and
   the operations further comprise determining a position-value difference ($X_{diff}$) between the initial position value ($X_{estimated}$) calculated and the desired resulting position value ($X_{desired}$), representing a required distance needed to move the active material to the resulting position value ($X_{desired}$) from the initial position value ($X_{estimated}$);and
   generating the control signal is performed using the position-value difference ($X_{diff}$) determined.

19. The system of claim 15, wherein the position-change information comprises a desired position change ($\Delta X_{command}$) for the pre-tensioned active material, the desired position change ($\Delta X_{command}$) is a difference between the desired resulting position ($X_{desired}$) and the initial position value ($X_{estimated}$) calculated.

* * * * *